United States Patent
Kim et al.

(10) Patent No.: US 11,718,345 B2
(45) Date of Patent: Aug. 8, 2023

(54) LOWER BODY FOR VEHICLE

(71) Applicants: Hyundai Motor Company, Seoul (KR); Kia Corporation, Seoul (KR)

(72) Inventors: Won Oh Kim, Ansan-si (KR); Seok Ju Gim, Seongnam-si (KR); Ji Ae Yong, Hwaseong-si (KR); Ho Yeon Kim, Daegu (KR); Chui Hee Heo, Hwaseong-si (KR); Tae Gyu Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/875,984

(22) Filed: Jul. 28, 2022

(65) Prior Publication Data

US 2023/0182815 A1 Jun. 15, 2023

(30) Foreign Application Priority Data

Dec. 15, 2021 (KR) ........................ 10-2021-0179801

(51) Int. Cl.
*B62D 21/11* (2006.01)
*B62D 21/15* (2006.01)

(52) U.S. Cl.
CPC ............ *B62D 21/11* (2013.01); *B62D 21/155* (2013.01)

(58) Field of Classification Search
CPC .... B62D 21/11; B62D 21/152; B62D 21/155; B62D 21/02; B62D 21/03; B62D 21/12
See application file for complete search history.

(56) References Cited

U.S. PATENT DOCUMENTS

| 2,485,500 | A  | * | 10/1949 | Lyman ................... | B62D 21/02 |
|---|---|---|---|---|---|
|  |  |  |  |  | 105/422 |
| 2004/0069556 | A1 | * | 4/2004 | Chernoff ................. | B60L 50/66 |
|  |  |  |  |  | 180/311 |
| 2009/0014993 | A1 | * | 1/2009 | Tope ...................... | B62D 21/08 |
|  |  |  |  |  | 180/311 |
| 2021/0171125 | A1 | * | 6/2021 | Yong .................... | B62D 31/003 |

(Continued)

FOREIGN PATENT DOCUMENTS

| CN | 108556916 | A | * | 9/2018 |  |
|---|---|---|---|---|---|
| CN | 109367622 | A | * | 2/2019 | .............. B60K 1/02 |

(Continued)

*Primary Examiner* — Paul N Dickson
*Assistant Examiner* — Matthew D Lee
(74) *Attorney, Agent, or Firm* — Slater Matsil, LLP

(57) ABSTRACT

A lower body for a vehicle includes front and rear main bodies each including pipes, a pair of first longitudinal members extending in a forward/rearward direction and spaced apart from each other in a transverse direction, a first transverse member extending in the transverse direction and connecting the first longitudinal members, and mounting parts each having an outer side to which the first longitudinal members and the first transverse member are coupled, and a pair of lower body main members connecting the outer sides of the mounting parts and two opposite sides of upper ends of the front and rear main bodies spaced apart from each other, the pair of lower body main members each having a pipe shape and extending forward and rearward to constitute upper side members of the front and rear main bodies and defining an overall length of the vehicle.

20 Claims, 6 Drawing Sheets

(56) References Cited

U.S. PATENT DOCUMENTS

| | | | |
|---|---|---|---|
| 2021/0253171 A1* | 8/2021 | Yotsuyanagi | B62D 21/157 |
| 2022/0017146 A1* | 1/2022 | Woo | B62D 21/02 |
| 2022/0041042 A1* | 2/2022 | Drabon | B60L 50/60 |
| 2022/0185374 A1* | 6/2022 | Seo | B62D 21/11 |
| 2022/0185383 A1* | 6/2022 | Heo | B62D 25/04 |
| 2022/0185390 A1* | 6/2022 | Yong | B62D 27/023 |
| 2023/0065302 A1* | 3/2023 | Kang | B62D 25/08 |

FOREIGN PATENT DOCUMENTS

| | | | | |
|---|---|---|---|---|
| CN | 110509998 A | * | 11/2019 | |
| CN | 112141000 A | * | 12/2020 | B60K 1/04 |
| DE | 102010030295 A1 | * | 12/2011 | B62D 21/02 |
| KR | 20210083533 A | | 7/2021 | |

* cited by examiner

LOWER BODY FOR VEHICLE

CROSS-REFERENCE TO RELATED APPLICATIONS

The present application claims the benefit of Korean Patent Application No. 10-2021-0179801, filed on Dec. 15, 2021, which application is hereby incorporated herein by reference.

TECHNICAL FIELD

The present invention relates to a lower body for a vehicle.

BACKGROUND

A general structure of a vehicle body is manufactured by machining and welding components through a pressing process using molds. For this reason, there is a problem in that a massive amount of investment is required for facilities such as pressing factories, vehicle body welding factories, and painting factories, and a design degree of freedom is low.

In particular, in the case of the vehicle body in the related art, a large number of changes in design are required to manufacture a small number of products of various types. For this reason, there is a problem in that the number of molds is rapidly increased, which inevitably increases production costs.

Recently, it is necessary to simplify a process of manufacturing a vehicle and minimize a development period to meet customer needs and cope with quickly changing market environments in a timely manner.

Therefore, there is a need for a vehicle body structure capable of improving assembly properties of a vehicle body in a smart factory environment while coping with various types of designs.

In addition, recently, with the development of autonomous driving technologies, there is a need for a vehicle capable of transporting freight without requiring a driver to drive the vehicle. To reduce costs required to manufacture an autonomous vehicle in which the driver is not seated and to simplify a process of manufacturing the autonomous vehicle, there is a need for a vehicle capable of being manufactured in an environmentally friendly smart factory in which some components are modularized, and a vehicle body is assembled by mechanically assembling the modularized components of the vehicle by bolting or the like without requiring a pressing process, a vehicle body welding process, and a painting process.

The foregoing explained as the background is intended merely to aid in the understanding of the background of the present invention, and is not intended to mean that the present invention falls within the purview of the related art that is already known to those skilled in the art.

SUMMARY

The present invention relates to a lower body for a vehicle. Particular embodiments relate to technology related to a vehicle body structure of a vehicle that operates for the purpose of freight delivery, portable marketing, and the like. Particular embodiments further relate to technology related to a vehicle body frame structure used to simplify a process of manufacturing a vehicle.

Embodiments of the present invention can solve problems in the art and provide a vehicle simply assembled by manufacturing a vehicle body of the vehicle by coupling a plurality of pipes by bolting.

A lower body for a vehicle according to embodiments of the present invention is configured by a plurality of pipes, has an upper portion to which an upper body is assembled, and includes front and rear main bodies configured by the plurality of pipes and each including a pair of first longitudinal members extending in a forward/rearward direction of the vehicle and spaced apart from each other in a transverse direction, a first transverse member extending in the transverse direction of the vehicle and configured to connect the first longitudinal members, and mounting parts each having an outer side to which the first longitudinal member and the first transverse member are coupled, the mounting parts being configured such that suspensions are mounted thereon, and a pair of lower body main members each having a pipe shape, configured to connect the outer sides of the mounting parts and two opposite sides of upper ends of the front and rear main bodies spaced apart from each other, the pair of lower body main members extending forward and rearward to constitute upper side members of the front and rear main bodies and configured to define an overall length of the vehicle.

The front and rear main bodies may be disposed to have the same shape so as to be symmetric in the forward/rearward direction of the vehicle.

The front and rear main bodies may each further include a plurality of first connection members extending downward from the mounting parts and spaced apart from one another in the transverse direction and a second transverse member extending in the transverse direction of the vehicle and configured to connect lower ends of the plurality of first connection members.

The front and rear main bodies may each further include a pair of second longitudinal members each having a pipe shape extending in the forward/rearward direction from the first connection members and an end module having a pair of third transverse members positioned at ends of the front and rear main bodies, configured by the plurality of pipes, extending in a width direction, and spaced apart from each other in an upward/downward direction, and a second connection member extending in the upward/downward direction and configured to connect the third transverse members, the end module having an upper end connected to the first longitudinal members.

The lower body may further include sub-frames each including a pair of sub-longitudinal members disposed at a lower side of each of the front and rear main bodies, configured by the plurality of pipes, and configured to connect the second transverse member and a lower end of the end module extending in the forward/rearward direction of the vehicle, and a sub-transverse member configured to connect the sub-longitudinal members, in which each of the sub-frames is connected to lower portions of the suspensions.

The sub-frame may further include sub-connection members extending in the upward/downward direction of the vehicle and configured to connect the sub-longitudinal members and the second longitudinal members.

The front and rear main bodies may each further include a back beam having a pipe shape extending in the transverse direction and connected to ends of the pair of second longitudinal members.

The front and rear main bodies may each further include connection units configured to connect the back beam and the second connection members.

The mounting part may have a quadrangular shape, an upper portion of the suspension may be coupled to a central portion of the mounting part, the first transverse member may be coupled to the mounting part inside the vehicle, the first longitudinal member may be coupled to the mounting part in a longitudinal direction, and the lower body main member may be coupled to the mounting part outside the vehicle.

An end of the front main body, the rear main body, or the lower body main member, which is configured by the plurality of pipes, may be opened, an end patch may be coupled to the end to close the end and configured to couple the plurality of pipes, the end patch may be coupled by welding in a state of being spaced apart inward from the end of the front main body, the rear main body, or the lower body main member, and a bead produced by welding may be positioned in a separation space formed as the end patch is spaced apart inward from the front main body, the rear main body, or the lower body main member.

The lower body for a vehicle according to embodiments of the present invention may be configured by the plurality of pipes, and the plurality of pipes is fastened by bolting or riveting, which reduces costs. In addition, the lower body for a vehicle is designed to be easily assembled or disassembled, such that the maintenance may be easily performed and the component of the lower body may be easily replaced with another component when the lower body is damaged.

In addition, the lower body may be applied to various vehicles according to the customer's requirements by adjusting the lengths of the lower body main member and the lower body floor member that connect the front main body and the rear main body, which makes it possible to reduce manufacturing costs and design costs.

In addition, the front and rear main bodies may have the plurality of members extending in the longitudinal direction, thereby enhancing rigidity of the vehicle body and solving the problems of the vehicle body frame connected by the pipes.

DETAILED DESCRIPTION OF ILLUSTRATIVE EMBODIMENTS

Figure 1:
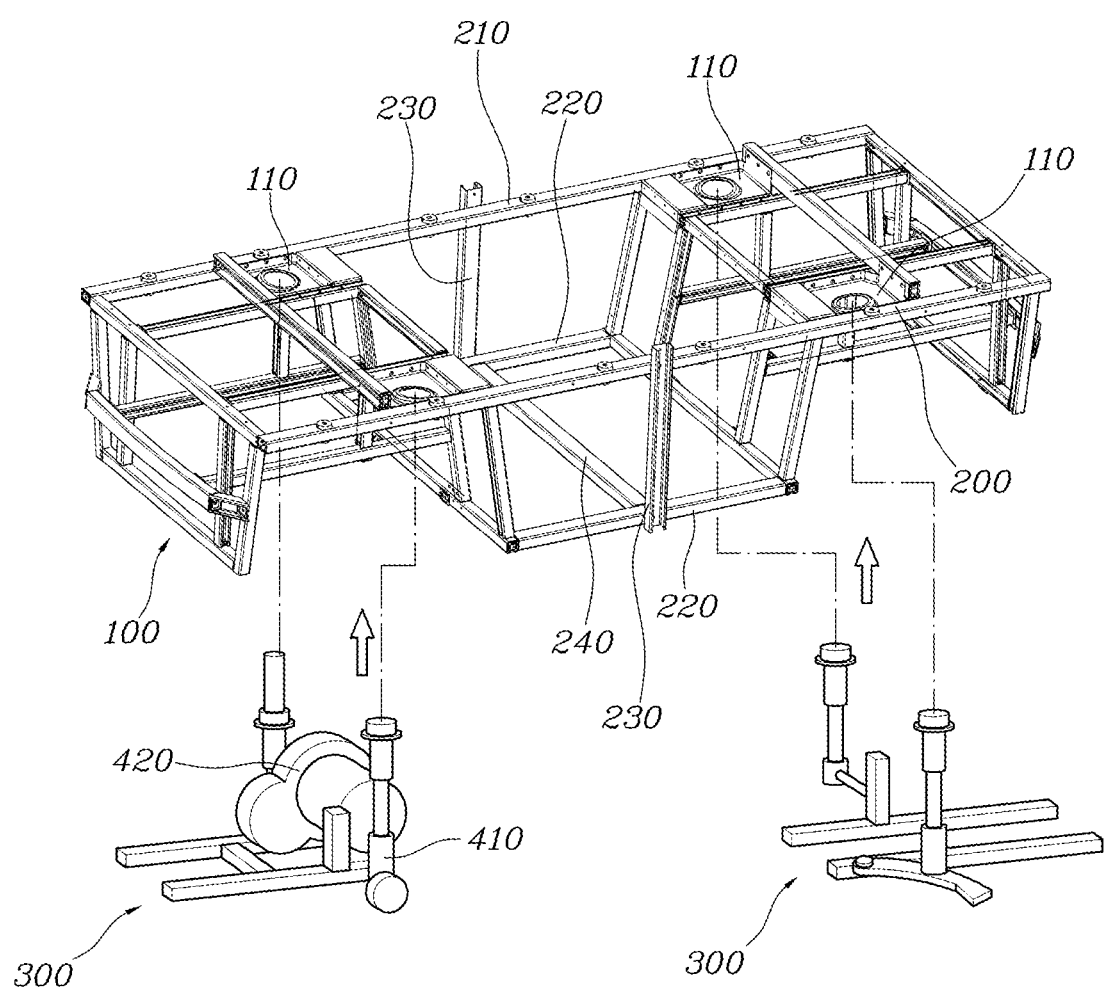
FIG. 1 is a perspective view of a lower body for a vehicle according to an embodiment of the present invention.

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first," "second," and other numerical terms may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, such as, "between" and "just between" or "adjacent to" and "directly adjacent to", for explaining a relationship between constituent elements, should be interpreted in a similar manner.

The terms used in the present specification are used to just describe specific embodiments and do not intend to limit the present invention. Singular expressions include plural expressions unless clearly described as having different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as having ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

In the related art, a process of manufacturing a vehicle is performed for a comparatively long period of time and a large amount of manufacturing cost is required to provide the vehicle with a suspension for a vehicle, exterior components, interior components, a steering system, a safety device, and the like in consideration of convenience for passengers getting into the vehicle, ride quality for the passengers, safety specifications, external appearances, traveling performance, and the like. In addition, because separate vehicles suitable for various applications need to be manufactured, there is a problem in that it is impossible to manufacture customized vehicles suitable for all applications.

The vehicle, to which the technology according to embodiments of the present invention is applied, is a business vehicle, such as a purpose-built vehicle (PBV), used for various commercial purposes such as product distribution, food trucks, delivery, and service provision. In the case of the illustrated representative embodiments, passengers are not seated in the vehicle, but only freight is loaded into an internal space of the vehicle. Further, the vehicle is driven by an autonomous driving system and used for unmanned delivery of freight or food, product distribution, and product delivery.

The vehicle according to embodiments of the present invention has a simplified structure, such that a process of designing and manufacturing the vehicle may be simplified. An advantage of the vehicle is that components of the vehicle may be modularized, such that costs may be reduced, a supply of components may be easily performed, and the vehicle may be completely manufactured by mechanically coupling the modularized components of the vehicle by bolting, riveting, or the like through production processes in an environmentally friendly smart factory without a pressing process, a vehicle body welding process, and a painting process.

Embodiments of the present invention relate to a method of simplifying a manufacturing process, excluding a welding process as much as possible, and manufacturing the vehicle body by using a plurality of pipes to reduce costs required to manufacture vehicle body members. The pipe may be manufactured by extrusion, roll-forming, or the like, and thus the manufacturing cost is advantageously low. However, it is necessary to reinforce coupling strength at the time of coupling the pipes or coupling the pipe and other panels. Therefore, according to embodiments of the present invention, a coupling member is applied to close an opened end of the pipe to firmly couple the end of the pipe to another pipe or the panel, and the coupling member may inhibit deformation of the opened end of the pipe and provide a coupling surface to which another component is coupled. The specific configuration of the coupling member will be described below. According to the structure of embodiments of the present invention in which the pipe and the coupling member are integrated, the vehicle body may be easily assembled only by mechanical coupling such as bolting or riveting in the environmentally friendly smart factory, and the structure of embodiments of the present invention may be environmentally friendly because welding or the like is not needed. Some members of the vehicle body may be easily replaced in the event of accidents or maintenance, and various types of vehicles may be easily assembled and produced.

The vehicle, to which embodiments of the present invention is applied, may be divided into a business region positioned at an upper side and configured to allow freight to be loaded thereon, and a drive region positioned at a lower side and configured to drive the vehicle. The business region may be variously changed depending on a customer's requirements, and the drive region may be variously changed depending on driving conditions of the vehicle.

The vehicle according to the illustrated embodiments is basically designed to have a structure in which a door is opened only at one side and a space in which freight may be loaded is opened. The business region may be designed to have various shapes depending on the customer's requirements.

The lower body for a vehicle according to embodiments of the present invention constitutes the vehicle body positioned in the drive region of the vehicle for an unmanned delivery system.

Figure 2:
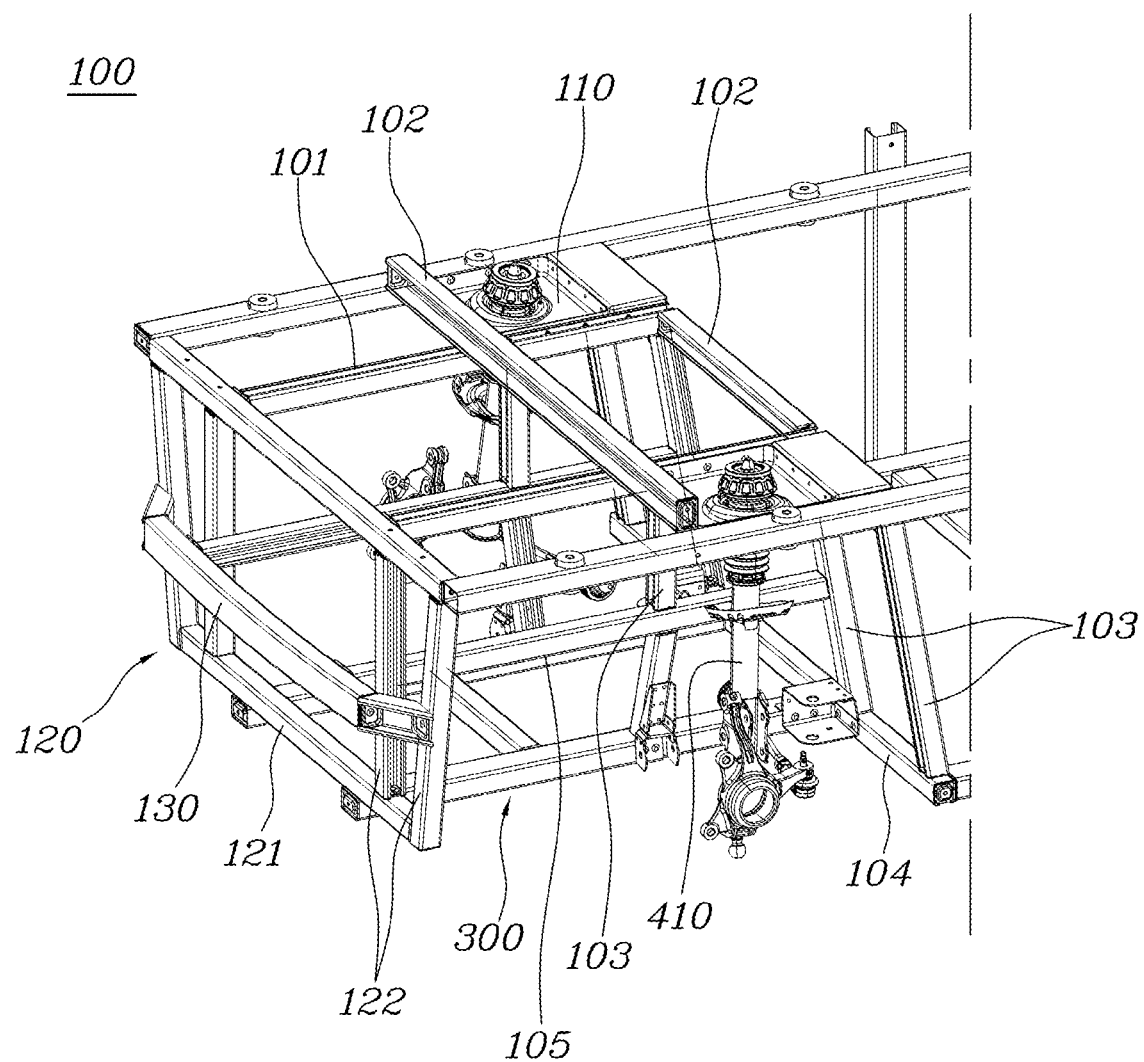
FIG. 2 is a perspective view of a front main body included in the lower body for a vehicle according to an embodiment of the present invention.
Figure 3:
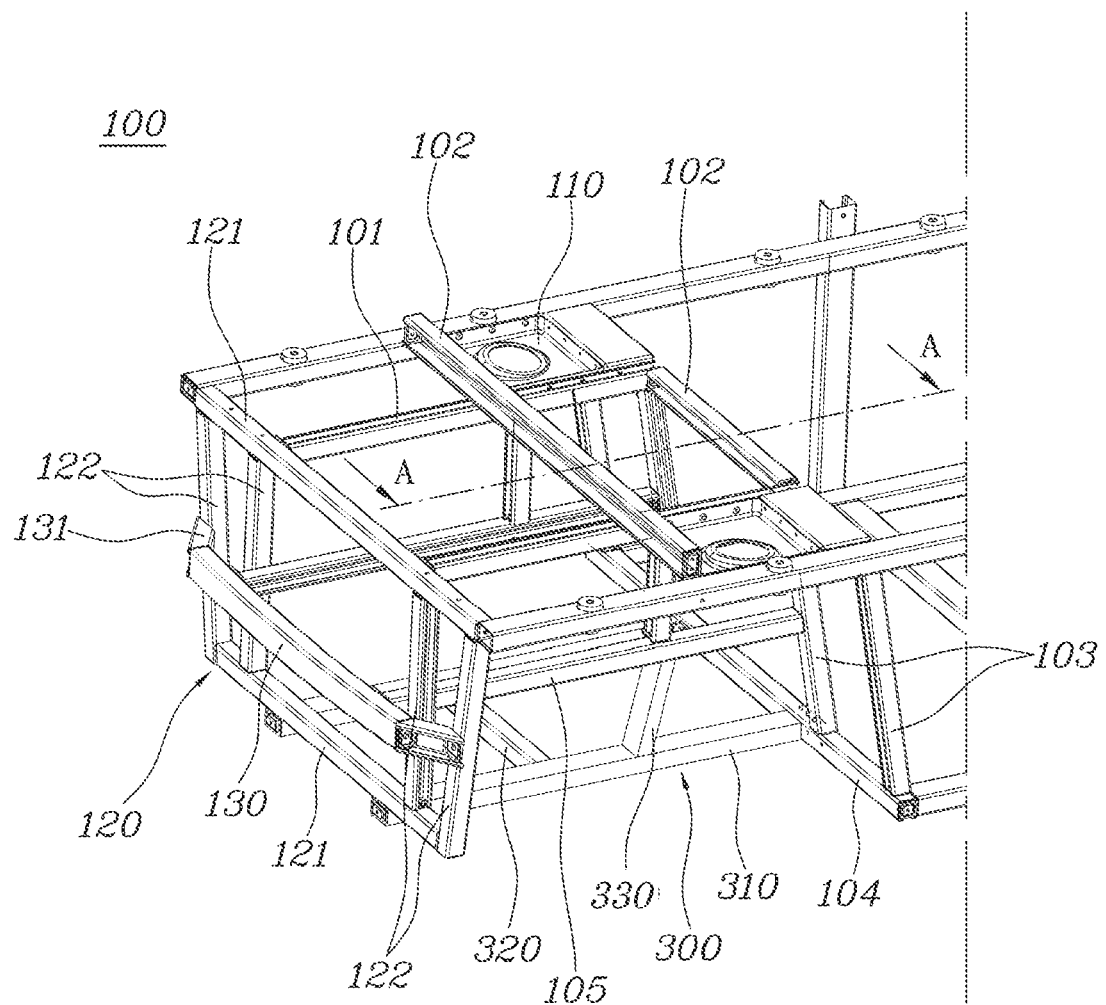
FIG. 3 is a perspective view illustrating a state in which a drive device and a suspension are removed from the lower body for a vehicle according to an embodiment of the present invention.
Figure 4:
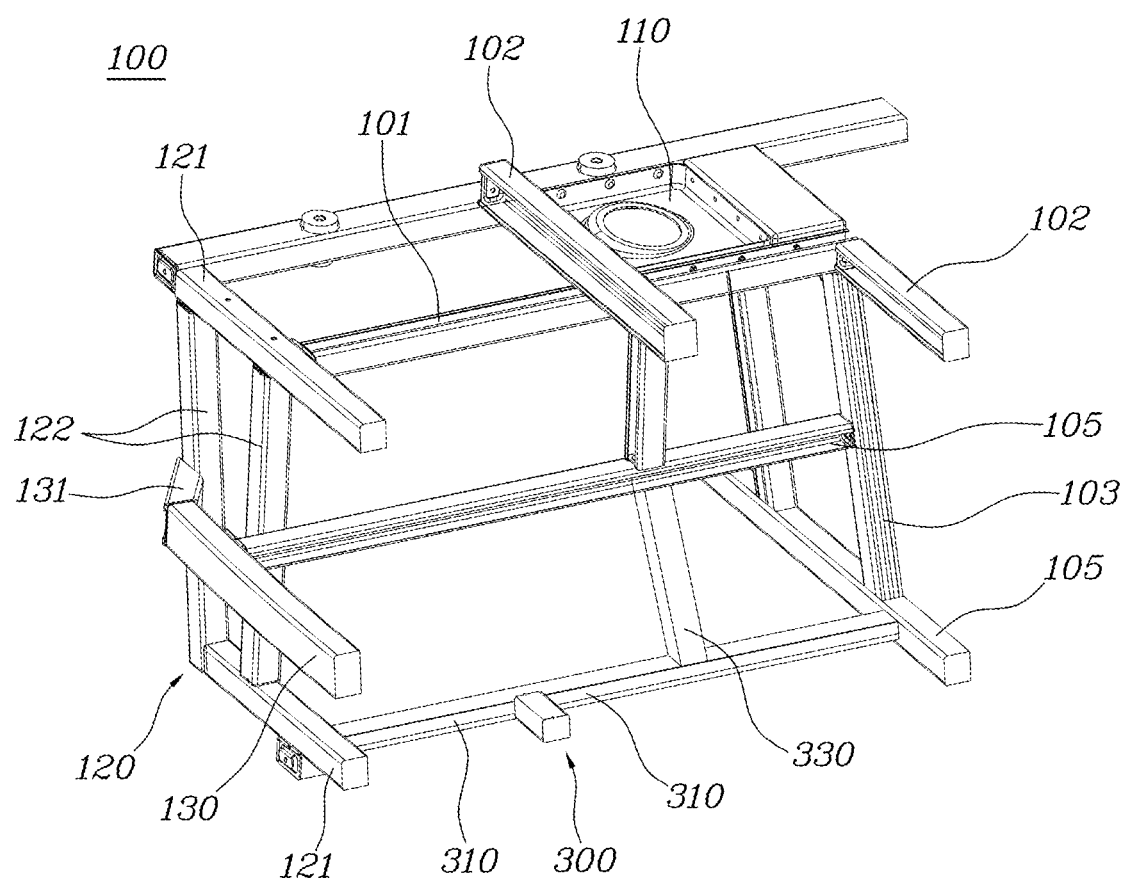
FIG. 4 is a cross-sectional view taken along line A-A in FIG. 3.
Figure 5:
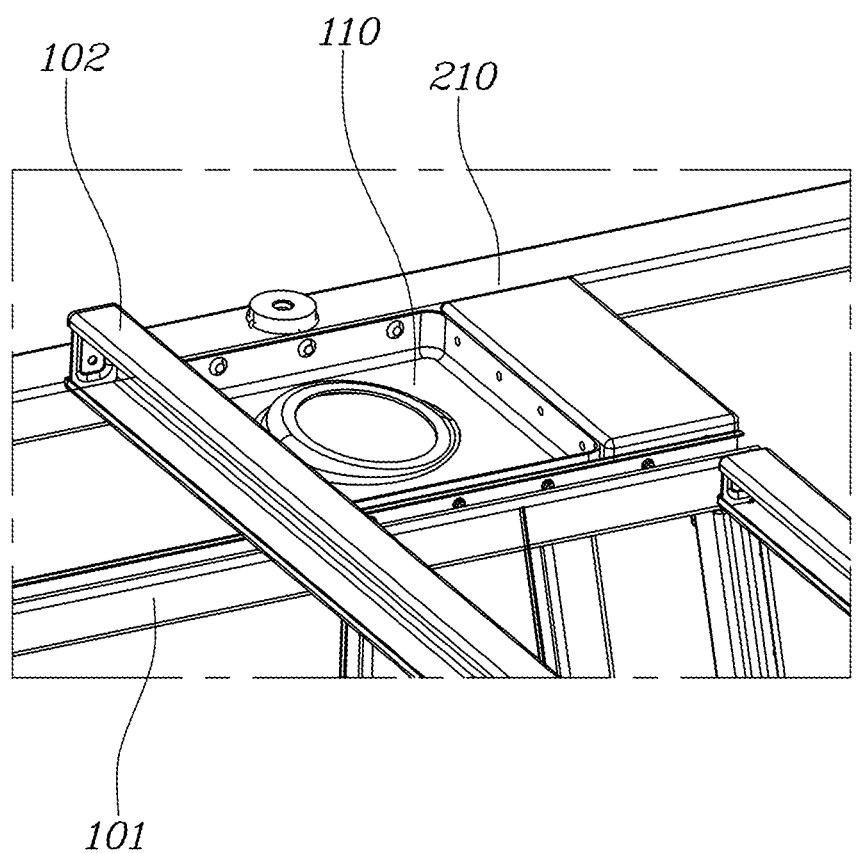
FIG. 5 is an enlarged view of a mounting part of the lower body for a vehicle according to an embodiment of the present invention.

FIG. 1 is a perspective view of a lower body for a vehicle according to an embodiment of the present invention, FIG. 2 is a perspective view of a front main body included in the lower body for a vehicle according to an embodiment of the present invention, FIG. 3 is a perspective view illustrating a state in which a drive device and a suspension are removed from the lower body for a vehicle according to an embodiment of the present invention, FIG. 4 is a cross-sectional view taken along line A-A in FIG. 3, and FIG. 5 is an enlarged view of a mounting part of the lower body for a vehicle according to an embodiment of the present invention.

Exemplary embodiments of the lower body for a vehicle according to the present invention will be described with reference to FIGS. 1 to 5.

The lower body for a vehicle according to embodiments of the present invention is a lower body for a vehicle including a plurality of pipes and having an upper portion to which an upper body is assembled. The lower body includes front and rear main bodies 100 configured by a plurality of pipes and each including a pair of first longitudinal members 101 extending in a forward/rearward direction of the vehicle and spaced apart from each other in a transverse direction, a first transverse member 102 extending in the transverse direction of the vehicle and configured to connect the first longitudinal members 101, and mounting parts 110 each having an outer side to which the first longitudinal member 101 and the first transverse member 102 are coupled, the mounting parts 110 being configured such that suspensions are mounted thereon, and a pair of lower body main members 210 each having a pipe shape, configured to connect the outer sides of the mounting parts 110 and two opposite sides of upper ends of the front and rear main bodies 100 spaced apart from each other, extending forward and rearward to constitute upper side members of the front and rear main bodies 100, and configured to define an overall length of the vehicle.

As illustrated in FIGS. 1 and 2, in the lower body for a vehicle, the front main body 100, the rear main body 100, and the lower body main member 210 may be configured by the plurality of pipes and connected to one another.

The front and rear main bodies 100 may be respectively disposed at front and rear sides of the vehicle and configured to absorb impact in the event of a front or rear collision of the vehicle, thereby maximally protecting freight loaded onto upper portions thereof.

In addition, suspensions 410 may be mounted on the front and rear main bodies 100. The front and rear main bodies 100 may each have a wheel house in which a wheel connected to the suspension 410 is positioned.

The front and rear main bodies 100 may be disposed to have the same shape so as to be symmetric in the forward/rearward direction of the vehicle.

The front and rear main bodies 100 may each have the mounting part 110 to which an upper end of the suspension 410 is coupled. The front and rear main bodies 100 may each have the first transverse member 102 extending in the transverse direction of the vehicle, and the pair of first longitudinal members 101 extending in the forward/rearward direction of the vehicle. The first transverse member 102 and the pair of first longitudinal members 101 are coupled to intersect each other. The mounting part 110 may be coupled and fixed to the first transverse member and the first longitudinal member 101.

In addition, the lower body main members 210 may extend in the forward/rearward direction of the vehicle and be coupled to outer sides of the front and rear main bodies 100 to constitute the upper side members of the front and rear main bodies 100. The outer side of the mounting part 110 is coupled and fixed to the lower body main member 210, such that the suspension 410 may be securely fixed to the lower body.

In addition, the first longitudinal members 101 and the lower body main members 210, which extend in a longitudinal direction of the vehicle, are disposed in parallel with one another at an upper side of the lower body, such that the first longitudinal members 101 and the lower body main members 210 may mitigate impact at the upper side of the lower body in the event of a collision in the forward/rearward direction of the vehicle.

The front and rear main bodies 100 may each further include a plurality of first connection members 103 extending downward from the mounting parts 110 and spaced apart from one another in the transverse direction, and a second transverse member 104 extending in the transverse direction of the vehicle and configured to connect lower ends of the plurality of first connection members 103.

As illustrated in FIGS. 1 to 3, the plurality of first connection members 103 may extend downward from the mounting parts 110 and be disposed to be spaced apart from one another in the longitudinal direction of the vehicle. The second transverse member 104 may be disposed below the plurality of first connection members 103, extend in the transverse direction of the vehicle, and connect the lower ends of the plurality of first connection members 103.

Therefore, it is possible to inhibit an upward/downward movement of the mounting part 110, thereby more securely fixing the mounting part to the lower body for a vehicle.

The front and rear main bodies 100 may each further include a pair of second longitudinal members 105 each having a pipe shape extending in the forward/rearward direction from the first connection members 103 and an end module 120 having a pair of third transverse members 121 positioned at ends of the front and rear main bodies 100, configured by a plurality of pipes, extending in a width direction, and spaced apart from each other in the upward/downward direction, and second connection members 122 extending in the upward/downward direction and configured to connect the third transverse members 121, and an upper end of the end module 120 is connected to the first longitudinal members 101.

To mitigate impact applied to the front side of the vehicle in the event of a front collision of the vehicle, the second longitudinal members 105 may extend in the longitudinal direction from the first connection members 103 of the front and rear main bodies 100, and the end module 120 may include the plurality of second connection members 122 connected to the second longitudinal members 105 and extending in the upward/downward direction of the vehicle, and the third transverse members 121 extending in the transverse direction of the vehicle and configured to connect the ends of the second connection members 122.

Therefore, it is possible to mitigate impact in the event of a collision at the front side of the front main body 100 and the rear side of the rear main body 100.

In addition, the second longitudinal members 105, which are disposed in parallel with and spaced apart, in the upward/downward direction, from the first longitudinal members 101 extending in the longitudinal direction at the upper side, may improve a supporting force against impact caused by front and rear collisions.

The lower body may further include sub-frames 300 each including a pair of sub-longitudinal members 310 disposed at a lower side of each of the front and rear main bodies 100, configured by a plurality of pipes, and configured to connect the second transverse member 104 and a lower end of the end module 120 extending in the forward/rearward direction of the vehicle, and a sub-transverse member 320 configured to connect the sub-longitudinal members 310. The sub-frame 300 is connected to lower portions of the suspensions 410.

As illustrated in FIGS. 1 to 3, the sub-frame 300 may include the pair of sub-longitudinal members 310 extending in the longitudinal direction of the vehicle and spaced apart from each other in the transverse direction of the vehicle and the sub-transverse member 320 extending in the transverse direction of the vehicle to connect the pair of sub-longitudinal members 310. The pair of sub-frames 300 may be provided and coupled to the lower sides of the front and rear main bodies 100, respectively.

The sub-frames 300 coupled to the lower sides of the front and rear main bodies 100 may be coupled to lower arms connected to lower ends of the suspensions 410. The drive device 420 may be disposed at an upper side of the sub-frame 300.

In addition, the sub-longitudinal members 310 may connect the second longitudinal members 105 and the lower ends of the end modules 120, thereby supporting the lower ends of the front and rear sides of the vehicle.

The sub-frame 300 may further include sub-connection members 330 extending in the upward/downward direction of the vehicle and configured to connect the sub-longitudinal members 310 and the second longitudinal members 105.

The sub-frames 300 coupled to the lower sides of the front and rear main bodies 100 may each have the sub-connection members 330 extending upward from the sub-transverse member 320 and connected to the second longitudinal members 105. The sub-connection members 330 may support a load of the drive device 420 positioned at the upper side of the sub-frame 300 and fix the sub-frame 300.

The front and rear main bodies 100 may each further include a back beam 130 having a pipe shape extending in the transverse direction and connected to the ends of the pair of second longitudinal members 105.

The back beam 130 may be coupled to the ends of the second longitudinal members 105, coupled to the end of each of the front and rear main bodies 100, and disposed at each of the front and rear sides of the vehicle.

Therefore, the back beams 130 may be disposed at foremost and rearmost sides of the vehicle. The back beams 130 may primarily absorb impact, and a load path of impact may lead to the second longitudinal members 105.

The front and rear main bodies 100 may each further include connection units 131 configured to connect the back beam 130 and the second connection members 122.

As illustrated in FIG. 3, the plurality of second connection members 122 may be disposed to be spaced apart from one another in the transverse direction of the vehicle. The plurality of second connection members 122 may be disposed outward from a length of the back beam 130.

The connection unit 131 is provided to connect the back beam 130 and the second connection member 122 positioned outward from the back beam 130. The connection unit 131 may transmit an impact, which is transmitted from the back beam 130, to the end module 120, thereby dispersing an impact force.

The mounting part 110 has a quadrangular shape. An upper portion of the suspension 410 may be coupled to a central portion of the mounting part 110. The first transverse member 102 may be coupled to the mounting part 110 inside the vehicle, the first longitudinal member 101 may be coupled to the mounting part 110 in the longitudinal direction, and the lower body main member 210 may be coupled to the mounting part 110 outside the vehicle.

As illustrated in FIG. 5, the mounting part 110 may have a quadrangular shape, and the upper end of the suspension 410 may be coupled to the central portion of the mounting part 110. The first transverse member 102 may be connected to one side surface of the mounting part 110, the first longitudinal member 101 may be connected to an inner surface of the vehicle, and the lower body main member 210 may be connected to an outer surface of the vehicle.

The outer surface of the mounting part 110 is coupled to the pipe, such that the mounting part 110 coupled to the suspension 410 may be securely coupled to the vehicle body.

The lower body may further include a pair of lower body floor members 220 each having a pipe shape and configured to connect two opposite sides of the lower ends of the front and rear main bodies 100 spaced apart from each other.

The lower body floor members 220 may connect the lower sides of the front and rear main bodies 100 in the state in which the front and rear main bodies 100 are spaced apart from each other in the forward/rearward direction of the vehicle and coupled by the lower body main members 210, thereby reinforcing the coupling force between the front and rear main bodies 100.

Therefore, the lower body for a vehicle includes the front main body 100, the rear main body 100, the lower body main members 210, and the lower body floor members 220, which are configured by the plurality of pipes, such that the manufacturing process may be simplified, and the manufacturing costs may be reduced.

In addition, a length of the lower body main member 210 and a length of the lower body floor member 220 may be variously adjusted depending on the purpose of the vehicle or the customer's requirements, such that an overall length of the vehicle and a wheelbase may be adjusted.

In addition, a space in which a component for driving the vehicle, such as a battery of the vehicle, is mounted may be provided between the front and rear main bodies 100 and disposed above the lower body floor members 220.

The lower body may further include a pair of lower body lateral members 230 extending in the upward/downward direction and connected to lateral sides of the lower body main members 210 and lateral sides of the lower body floor members 220 and a lower body auxiliary member 240 extending in the transverse direction of the vehicle and configured to connect the pair of lower body floor members 220 spaced apart from each other in the transverse direction of the vehicle.

As illustrated in FIG. 1, two opposite ends of the lower body lateral member 230 extending in the upward/downward direction at a lateral side of the vehicle may be respectively coupled to the lower body main member 210 and the lower body floor member 220.

The lower body lateral members 230 may connect the lower body main members 210 and the lower body floor members 220 that connect the front main body 100 and the rear main body 100, thereby increasing the coupling force. The lower body lateral members 230 may extend in the upward/downward direction and assist in supporting the load of the freight loaded at the upper side of the lower body main member 210 and the upper side of the lower body floor member 220. In addition, the lower body lateral members 230 may additionally absorb impact in the event of a collision accident at the lateral side of the vehicle.

In addition, as illustrated in FIG. 1, the pair of lower body floor members 220 may be disposed at the lower side of the lower body for a vehicle and connect the front main body 100 and the rear main body 100. The lower body auxiliary member 240 may connect the pair of lower body floor members 220 spaced apart from each other in the transverse direction of the vehicle.

Therefore, it is possible to improve rigidity between the lower body floor members 220. In the event of a broadside collision, the lower body auxiliary member 240 may disperse the impact, thereby reducing damage to the vehicle and protecting the loaded freight.

The lower body main members 210 and the lower body floor members 220 may each be provided in the form of a pipe having a cross-section with a closed cross-sectional shape.

The lower body main members 210 and the lower body floor members 220, which connect the front main body 100 and the rear main body 100, each need to have the pipe having higher rigidity than the pipe constituting each of the front main body 100 and the rear main body 100.

Therefore, the pipe constituting each of the lower body main members 210 and the lower body floor members 220 has a closed cross-sectional shape, extends in the longitudinal direction, and connects the front main body 100 and the rear main body 100. In the event of a broadside collision, the pipe may absorb the impact, safely protect the loaded freight from the broadside collision, and support the load of the loaded freight.

The ends of the front and rear main bodies 100, the lower body main members 210, or the lower body floor members 220, which are configured by the plurality of pipes, are opened, and the lower body may further include end patches 20 coupled to the ends of the pipes to close the ends of the pipes and configured to couple the plurality of pipes. The end patch 20 is coupled by welding in a state of being spaced apart inward from the end of the front main body 100, the rear main body 100, the lower body main member 210, or the lower body floor member 220, and a bead produced by welding may be positioned in a separation space formed as the end patch 20 is spaced apart inward from the front main body 100, the rear main body 100, the lower body main member 210, or the lower body floor member 220.

Figure 6:
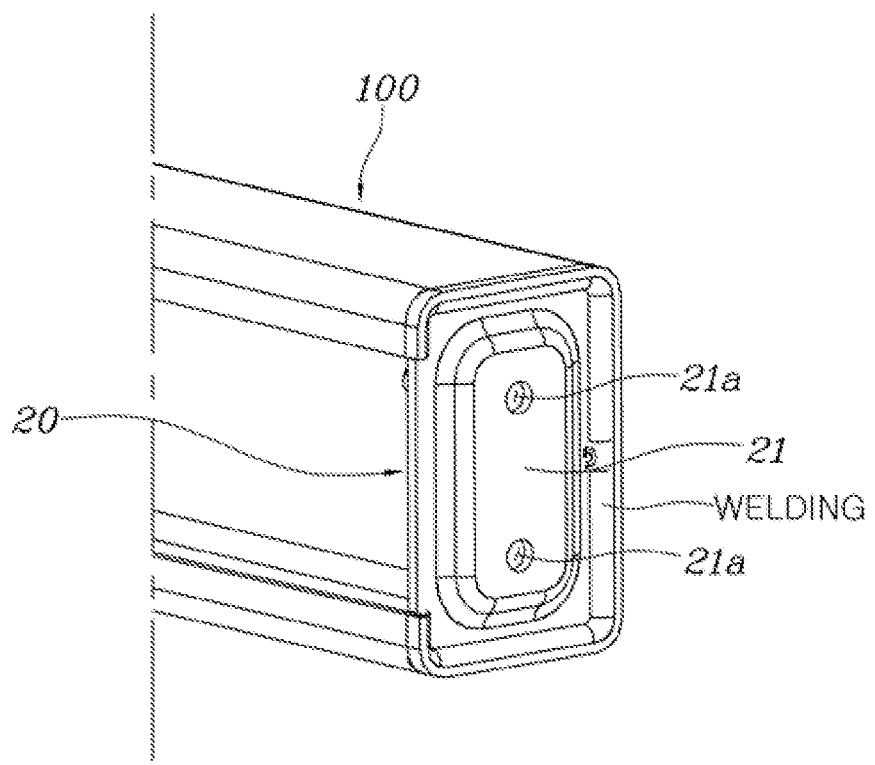
FIG. 6 is a perspective view illustrating a state in which an end patch is coupled to a vehicle body pipe according to an embodiment of the present invention.

FIG. 6 is a perspective view illustrating a state in which the end patch 20 is coupled to the vehicle body pipe according to an embodiment of the present invention.

As illustrated in FIG. 6, the end patch 20 may be coupled to the end of the pipe of each of the front and rear main bodies 100. In addition, although not illustrated in the drawings, the end patch 20 may also be coupled to the end of the lower body main member 210 or the lower body floor member 220, such that the pipes may be simply fastened to each other by bolting or riveting at the time of assembling the lower body for a vehicle.

In addition, the end patch 20 is coupled by welding in a state of being spaced apart inward from the end of the front main body 100, the rear main body 100, the lower body main member 210, or the lower body floor member 220, and the welding bead is positioned in the separation space. Therefore, it is not necessary to perform a process of removing the welding bead, and the manufacturing work may be simplified in comparison with the manufacturing process in the related art in which an end of a pipe is bent and welded and a welding bead is removed after the welding.

In addition, a coupling part 21 formed on the end patch 20 protrudes further than the end of the pipe and is coupled to another pipe, such that it is possible to minimize vibration or noise occurring on a coupling portion.

Through-holes 21a are penetratively formed in the coupling part 21, such that the pipes may be coupled by mechanical coupling including bolting or riveting. Therefore, the vehicle body may be completely manufactured by simply coupling the plurality of pipes in the smart factory, the manufacturing costs may be reduced, and the manufacturing process may be simplified.

While the specific embodiments of the present invention have been illustrated and described above, it will be obvious to those skilled in the art that the present invention may be variously modified and changed without departing from the technical spirit of the present invention defined in the appended claims.

What is claimed is:

1. A lower body for a vehicle, the lower body comprising: front and rear main bodies, each comprising:
    a plurality of pipes;
    a pair of first longitudinal members extending in a forward/rearward direction of the vehicle and spaced apart from each other in a transverse direction of the vehicle;
    a first transverse member extending in the transverse direction of the vehicle and connecting the first longitudinal members; and
    mounting parts each having an outer side to which the first longitudinal members and the first transverse member are coupled, wherein the mounting parts are configured to mount suspensions thereon; and
a pair of lower body main members connecting the outer sides of the mounting parts and two opposite sides of upper ends of the front and rear main bodies spaced apart from each other, the pair of lower body main members each having a pipe shape and extending forward and rearward to constitute upper side members of the front and rear main bodies and defining an overall length of the vehicle.

2. The lower body of claim 1, wherein the front and rear main bodies are disposed to have the same shape so as to be symmetric in the forward/rearward direction of the vehicle.

3. The lower body of claim 1, wherein the front and rear main bodies each further comprise:
    a plurality of first connection members extending downward from the mounting parts and spaced apart from one another in the transverse direction; and
    a second transverse member extending in the transverse direction of the vehicle and configured to connect lower ends of the plurality of first connection members.

4. The lower body of claim 3, wherein the front and rear main bodies each further comprise:
    a pair of second longitudinal members each having a pipe shape and extending in the forward/rearward direction from the first connection members; and
    an end module having an upper end connected to the first longitudinal members and the end module comprising:
        a pair of third transverse members positioned at ends of the front and rear main bodies, extending in a width direction, and spaced apart from each other in an upward/downward direction; and
        a second connection member extending in the upward/downward direction and connecting the third transverse members.

5. The lower body of claim 4, further comprising sub-frames configured to be connected to lower portions of the suspensions, wherein each sub-frame comprises:
    a pair of sub-longitudinal members disposed at a lower side of each of the front and rear main bodies and connecting the second transverse member and a lower end of the end module extending in the forward/rearward direction of the vehicle; and
    a sub-transverse member connecting the sub-longitudinal members.

6. The lower body of claim 5, wherein each sub-frame further comprises sub-connection members extending in the upward/downward direction of the vehicle and connecting the sub-longitudinal members and the second longitudinal members.

7. The lower body of claim 4, wherein the front and rear main bodies each further comprise a back beam having a pipe shape, extending in the transverse direction of the vehicle, and connected to ends of the pair of second longitudinal members.

8. The lower body of claim 7, wherein the front and rear main bodies each further comprise connection units connecting the back beam and the second connection members.

9. The lower body of claim 1, wherein:
    the mounting parts each have a quadrangular shape;
    an upper portion of a respective suspension is configured to be coupled to a central portion of the respective mounting part;
    the first transverse member is coupled to the respective mounting part inside the vehicle;
    a respective first longitudinal member is coupled to the respective mounting part in a longitudinal direction; and
    the lower body main member is coupled to the respective mounting part outside the vehicle.

10. The lower body of claim 1, wherein:
    an end of the front main body, the rear main body, or the lower body main member is opened and an end patch is coupled to the end to close the end and to couple the plurality of pipes; and
    the end patch is coupled by a weld in a state of being spaced apart inward from the end of the front main body, the rear main body, or the lower body main member, and a bead of the weld is positioned in a separation space defined as the end patch is spaced apart inward from the front main body, the rear main body, or the lower body main member.

11. A vehicle comprising:
    an upper body; and
    a lower body having an upper portion coupled to the upper body, the lower body comprising:
        front and rear main bodies, each comprising:
            a plurality of pipes;
            a pair of first longitudinal members extending in a forward/rearward direction of the vehicle and spaced apart from each other in a transverse direction of the vehicle;

a first transverse member extending in the transverse direction of the vehicle and connecting the first longitudinal members; and mounting parts each having an outer side to which the first longitudinal members and the first transverse member are coupled;

suspensions mounted on the mounting parts; and a pair of lower body main members connecting the outer sides of the mounting parts and two opposite sides of upper ends of the front and rear main bodies spaced apart from each other, the pair of lower body main members each having a pipe shape and extending forward and rearward to constitute upper side members of the front and rear main bodies and defining an overall length of the vehicle.

12. The vehicle of claim 11, wherein the front and rear main bodies are disposed to have the same shape so as to be symmetric in the forward/rearward direction of the vehicle.

13. The vehicle of claim 11, wherein the front and rear main bodies each further comprise:

a plurality of first connection members extending downward from the mounting parts and spaced apart from one another in the transverse direction; and a second transverse member extending in the transverse direction of the vehicle and configured to connect lower ends of the plurality of first connection members.

14. The vehicle of claim 13, wherein the front and rear main bodies each further comprise:

a pair of second longitudinal members each having a pipe shape and extending in the forward/rearward direction from the first connection members; and an end module having an upper end connected to the first longitudinal members and the end module comprising:

a pair of third transverse members positioned at ends of the front and rear main bodies, extending in a width direction, and spaced apart from each other in an upward/downward direction; and a second connection member extending in the upward/downward direction and connecting the third transverse members.

15. The vehicle of claim 14, further comprising sub-frames configured to be connected to lower portions of the suspensions, wherein each sub-frame comprises:

a pair of sub-longitudinal members disposed at a lower side of each of the front and rear main bodies and connecting the second transverse member and a lower end of the end module extending in the forward/rearward direction of the vehicle; and a sub-transverse member connecting the sub-longitudinal members.

16. The vehicle of claim 15, wherein each sub-frame further comprises sub-connection members extending in the upward/downward direction of the vehicle and connecting the sub-longitudinal members and the second longitudinal members.

17. The vehicle of claim 14, wherein the front and rear main bodies each further comprise a back beam having a pipe shape, extending in the transverse direction of the vehicle, and connected to ends of the pair of second longitudinal members.

18. The vehicle of claim 17, wherein the front and rear main bodies each further comprise connection units connecting the back beam and the second connection members.

19. The vehicle of claim 11, wherein:

the mounting parts each have a quadrangular shape;

an upper portion of a respective suspension is configured to be coupled to a central portion of the respective mounting part;

the first transverse member is coupled to the respective mounting part inside the vehicle;

a respective first longitudinal member is coupled to the respective mounting part in a longitudinal direction; and the lower body main member is coupled to the respective mounting part outside the vehicle.

20. The vehicle of claim 11, wherein:

an end of the front main body, the rear main body, or the lower body main member is opened and an end patch is coupled to the end to close the end and to couple the plurality of pipes; and the end patch is coupled by a weld in a state of being spaced apart inward from the end of the front main body, the rear main body, or the lower body main member, and a bead of the weld is positioned in a separation space defined as the end patch is spaced apart inward from the front main body, the rear main body, or the lower body main member.

* * * * *

UNITED STATES PATENT AND TRADEMARK OFFICE
CERTIFICATE OF CORRECTION

PATENT NO. : 11,718,345 B2
APPLICATION NO. : 17/875984
DATED : August 8, 2023
INVENTOR(S) : Kim et al.

It is certified that error appears in the above-identified patent and that said Letters Patent is hereby corrected as shown below:

On the Title Page

Item (72), in Column 1, in "Inventors", Line 4, delete "Chui" and insert -- Chul --.

Signed and Sealed this
Seventh Day of November, 2023

Katherine Kelly Vidal
*Director of the United States Patent and Trademark Office*